United States Patent
Mitschelen et al.

(10) Patent No.: US 6,193,317 B1
(45) Date of Patent: Feb. 27, 2001

(54) BACK SEAT ARRANGEMENT FOR PASSENGER COMPARTMENTS

(75) Inventors: Rolf Mitschelen, Kirchheim; Vasilios Orizaris, Renningten, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/377,687

(22) Filed: Aug. 20, 1999

(30) Foreign Application Priority Data

Aug. 20, 1998 (DE) .............................................. 198 37 838

(51) Int. Cl.⁷ ....................................................... B60N 2/20
(52) U.S. Cl. ...................... 297/378.1; 297/335; 297/336; 297/378.12; 296/65.01; 296/65.05; 296/69
(58) Field of Search ............................ 297/378.1, 378.12, 297/378.13, 335, 336, 468, 482; 296/65.01, 65.05, 69, 65.16

(56) References Cited

U.S. PATENT DOCUMENTS

| | | | |
|---|---|---|---|
| 4,124,250 | * | 11/1978 | Weinich ................................ 297/335 |
| 4,637,653 | * | 1/1987 | Yoshida et al. ................. 296/65.05 X |
| 4,759,583 | * | 7/1988 | Schrom et al. .................... 297/335 X |
| 5,015,026 | * | 5/1991 | Mouri ............................ 297/378.1 X |
| 5,133,589 | * | 7/1992 | Kimura ................................ 297/335 |
| 5,558,386 | * | 9/1996 | Tilly et al. ....................... 297/336 X |
| 5,658,046 | * | 8/1997 | Rus .................................... 297/378.1 |
| 5,681,077 | * | 10/1997 | Hashimoto ..................... 296/65.05 X |
| 5,702,145 | * | 12/1997 | Fowler et al. ................. 296/65.05 X |
| 5,730,496 | * | 3/1998 | Hashimoto ..................... 297/378.1 X |
| 5,795,023 | * | 8/1998 | Kayumi ............................. 297/336 X |
| 5,826,942 | * | 10/1998 | Sutton et al. .................... 297/378.12 |
| 5,913,570 | * | 6/1999 | Yoshida et al. ............... 297/378.1 X |
| 5,954,398 | * | 9/1999 | Namba et al. ................ 297/378.12 X |
| 5,988,726 | * | 11/1999 | Onoda et al. ......................... 296/69 X |
| 6,089,641 | * | 7/2000 | Mattarella et al. ........... 296/65.01 X |

FOREIGN PATENT DOCUMENTS

| | | |
|---|---|---|
| 27 18 140 | 10/1978 | (DE) . |
| 3629284 | 11/1987 | (DE) . |
| 4009645 | 10/1991 | (DE) . |
| 38 14 766 | 7/1992 | (DE) . |
| 41 41 836 | 4/1993 | (DE) . |
| 41 41 836 C1 | 4/1993 | (DE) . |
| 459 839 | 12/1991 | (EP) . |
| 516 512 | 8/1994 | (EP) . |
| 2 696 386 | 4/1994 | (FR) . |
| 2 172 199 | 9/1986 | (GB) . |

* cited by examiner

Primary Examiner—Peter M. Cuomo
Assistant Examiner—Rodney B. White
(74) Attorney, Agent, or Firm—Evenson, McKeown, Edwards & Lenahan, P.L.L.C.

(57) ABSTRACT

A back seat arrangement for passenger compartments, especially of motor vehicles, has a back seat bench which can be folded up into an upright position about a pivot axis arranged in its front region, a backrest, which can be tilted forwards into a flat position about a pivot axis arranged in its lower region, at least one rear belt buckle, which can be fixedly connected to the bodywork of the motor vehicle, and a back seat section arranged in the abutment region between the back seat bench and the backrest which serves for the positioning of the at least one rear belt buckle. The back seat section arranged in the abutment region between the back seat bench and the backrest is an intermediate padded part, extending at least in sections into the width of the seat, secured on the bodywork and separate from the back seat bench and the backrest, which holds the at least one rear belt buckle in the operating position.

20 Claims, 1 Drawing Sheet

BACK SEAT ARRANGEMENT FOR PASSENGER COMPARTMENTS

BACKGROUND AND SUMMARY OF THE INVENTION

Figure 1:
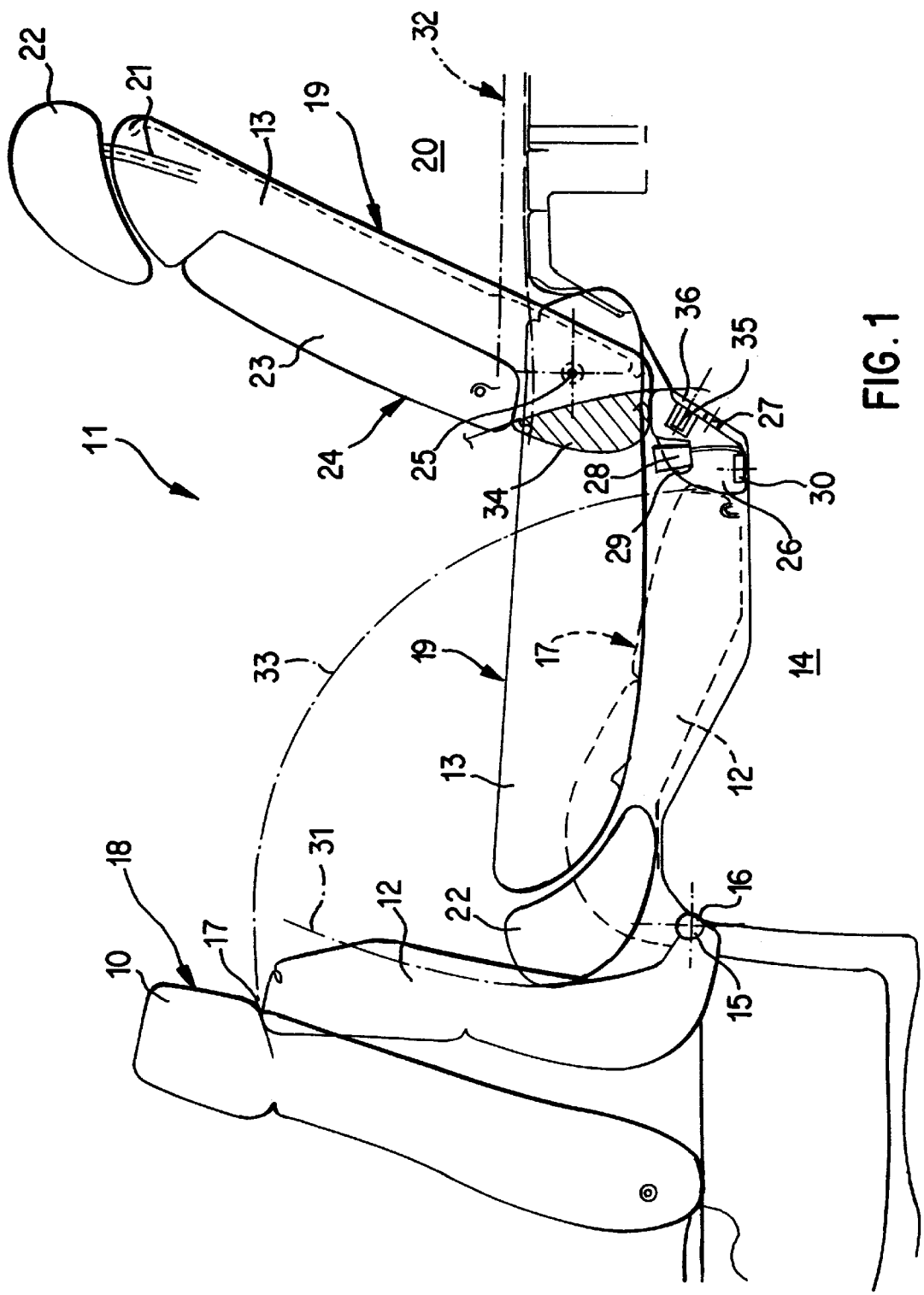

This application claims the priority of German Application No. 198 37 838.6-16, filed Aug. 20, 1998, the disclosure of which is expressly incorporated by reference herein.

The present invention relates to a back seat arrangement for passenger compartments of motor vehicles.

A generic back seat arrangement having a back seat bench which can be folded up into an upright position and a backrest tiltable into a flat position is disclosed by EP 0 459 839 A1. In the abutment region between the back seat bench and the backrest, an intermediate padded part extending in the transverse direction of the vehicle is provided which is arranged pivotably-on the lower end of the backrest and holds a belt buckle in the operating position. The intermediate padded part is coupled for movement purposes to the back seat bench via a cable or similar actuating device in order to bring the intermediate padded part into a forward-pivoted avoidance position when the back seat bench is folded up. Only after this pivoting of the intermediate padded part into its avoidance position can the backrest be folded forwards, the intermediate padded part pivotably arranged on the backrest being moved into the end position masked by the backrest.

A disadvantage of such a back seat arrangement is that a relatively elaborate actuating device is necessary in order to bring the intermediate padded part into the avoidance position permitting the forward-folding of the backrest. In addition, a tilting of the backrest is possible only if the back seat bench is in the folded-up upright position. The belt buckle has to be secured to the bodywork, via a relatively long and flexible strap, in order to allow the free pivotability of the intermediate padded part. This may in some circumstances, if a tensile force is applied to the belt buckle, for example in the event of an accident, result in an undesired yielding of the flexible strap.

From DE 41 41 836 C1, a rear seat is known to have a seat cushion, which can be folded forwards about its front edge into an upright position, and a backrest, which can be pivoted forwards about its lower edge into a flat position. To receive a belt buckle and to provide a belt buckle anchorage serving as a belt buckle fixture, which fixes the belt buckle on the bodywork, slit-like recesses are provided in the seat surface of the rear seat on or near to the backrest, in each of which a belt buckle partially rests. These recesses are at a distance from the back of the seat cushion, which can be folded up forwards, and set into the front of an extension part of the backrest drawn forwards into the region of the seat surface. Thus, the forward-folded seat cushion has a continuous contour in its upper region.

The belt buckle anchorage possesses a flexible member whereby the belt buckle can be secured at the bodywork end. If the backrest is now brought into its forward-tilted position, the flexible member is bent into a loop with the belt buckle still remaining in the recess. When the backrest is folded back, the flexible member is again located in the recess, in the de-stressed position, and can immediately be used by a passenger. As a result, the belt buckle threading operations, which are widespread with rear seats and time-intensive, can be avoided and the belt buckle can immediately be used again after the backrest has been folded back.

However, the construction of a rear seat with an extension part drawn forwards into the region of the seat surface requires a relatively large space below the back seat bench and a relatively large range of pivoting about the pivot axis of the backrest. As a result of the extension part, also, the backrest is extended, so that the latter requires a wide area between the folded-up back seat bench and its pivot axis in which it is accommodated in its forward-tilted position. This can result in space problems, especially if head restraints are additionally provided on the backrest. Not least importantly, the construction of this known rear seat is relatively costly because of the use of the flexible members.

Other back seat arrangements for motor vehicles are shown in DE 38 14 766 C2 and EP 0 516 512 B1. In DE 38 14 766 C2, a back seat arrangement is shown having a forward-foldable back seat bench and a tiltable backrest, whose seat-belt arrangement, connected to the vehicle floor, is guided through recesses in the back seat bench to the top of the seat. When the back seat bench is folded forwards, the belt buckles secured to the vehicle floor emerge from the recesses and are masked by the backrest when it is folded over. This arrangement has the disadvantage that the belt buckles have to be threaded into the recesses when the seat bench is subsequently folded back. Furthermore, the backrest, in its folded-over position between the folded-up seat bench and its pivot axis, requires a great deal of space, and it may be necessary for head restraints arranged above the back rest to be time-consumingly removed before the backrest is tilted. As an additional disadvantage, the recesses provided in the seat bench are very prone to soiling and difficult to clean.

In EP 0 516 512 B1, a back seat arrangement having a forward-foldable back seat bench and a tiltable backrest is also shown, its seat-belt arrangement, secured on the vehicle, projecting through recesses in the back seat bench to the backrest surface. With this arrangement also, the belt buckles disadvantageously have to be threaded into their recesses when the seat bench is folded back.

The object of the invention is to provide a back seat arrangement having a simplified structure and improved possibilities of use.

This object is achieved, according to the invention, by a particular back seat arrangement having an intermediate padded part which remains stationary on bodywork irrespective of a pivoted position of a back seat bench and/or backrest.

In the back seat arrangement according to the invention, the intermediate padded part is arranged between the backrest and the back seat bench on the bodywork in such a way that, irrespective of the pivoted position of the backrest and of the back seat bench, it can always remain in its stationary position. An improved possibility of use of the back seat arrangement is achieved by the fact that the backrest can be folded forwards without previously folding up the back seat bench. The belt buckle held in the operating position by the intermediate padded part can be secured by a very short route to the bodywork by a rigid connection, as a result of which the danger of undesired yielding of the belt buckle under tensile force, for example in the event of an accident, can be reduced.

As a result of the provision of the intermediate padded part between the back seat bench and the backrest, the width of the backrest between a pivot axis, extending in its lower area transverse to the direction of travel of the motor vehicle and horizontally, and its upper end is advantageously reduced. As a result of this reduction, the backrest may be brought into a flat position, with head restraints arranged at its upper end, after the back seat bench has been folded up, without these previously having to be removed from the backrest. In addition, the shortened back seat bench can be folded further forwards, as a result of which the carrying capacity of the vehicle can be increased.

As a result of the provision of the intermediate padded part between the back seat bench and the backrest, the possibility is advantageously created of integrating the rear belt buckle into the intermediate padded part and thus permitting a simple construction of the rear belt buckle in combination with the intermediate padded part.

As a further advantage, the belt buckle assigned to the intermediate padded part is cleared away when the back seat bench and the backrest are folded over and can then immediately be used again by a passenger when the back seat bench and the backrest are folded back, without any threading operation, and without a costly rear belt buckle fixture being required.

As an additional secondary effect, tolerances of continuous seams extending parallel to the direction of travel from the back seat bench to the backrest can be compensated for in the region of the intermediate padded part.

Advantageous embodiments of the back seat arrangement according to the invention with expedient developments of the invention are reflected in the claims.

Thus, in a further embodiment of the invention, it is preferred for the intermediate padded part to extend over the entire length of the back seat arrangement, thus achieving not only an optical improvement but also allowing a plurality of belt buckles to be integrated into the intermediate padded part.

In a further embodiment of the invention, the intermediate padded part is of one-piece or multi-piece design, as a result of which a partial region of the back seat arrangement can be removed from the vehicle.

If fixing sections fixed to the bodywork are masked by the removable intermediate padded part, they can be exposed for use by simply removing the intermediate padded part.

The exposed fixing sections are then used, in particular, for the securing of a child seat, which can be secured to the bodywork particularly favourably in the region of the intermediate padded part.

The intermediate padded part can, moreover, be replaced by a padded part which makes fixing sections accessible, for example through continuous recesses. In case of need, therefore, the back seat bench can simply be converted for securing one or more child seats.

If, in a further embodiment of the invention, a partial surface of the seat and/or backrest surface is formed by the intermediate padded part, the width of the back seat and the backrest can be varied and, as a result, the length, especially of the backrest, to be folded over can be adjusted to the dimensions of the region between the forward-folded back seat bench and the pivot axis of the backrest.

The seating of the rear belt buckle in a recess in the intermediate padded part permits, in a further embodiment of the invention, simple access by a passenger to the rear belt buckle and additionally creates a simple way of connecting the rear belt buckle fixedly to the bodywork via a belt buckle fixture, for example comprising a wire cable, metal plate, plastic strip or the like.

In a further embodiment of the invention, the rear belt buckle is directly attached to the intermediate padded part, which in this case takes on the function of the rear belt buckle fixture, and fixedly connected to the bodywork, as a result of which a simple, modular construction of the intermediate padded part with the rear belt buckles is obtained.

If the intermediate padded part, in a further embodiment of the invention, is arranged on a section of the bodywork in such a way that it does not interfere with the resting of the flat, folded-over backrest on a section of the bodywork, and at the same time the intermediate padded part is completely masked by the backrest, a particularly stable additional load-carrying surface and clean coverage of the intermediate padded part are obtained, providing protection against any soiling from the luggage compartment.

In a further embodiment of the invention, the backrest is supported in its flat position with the aid of the backrest surface and/or at least one head restraint arranged on the top of the backrest, as a result of which its damping effect can be exploited in the transportation of goods.

Further advantages, features and details of the invention are apparent from the description of a preferred example of embodiment which follows, and with reference to the drawing.

BRIEF DESCRIPTION OF THE DRAWING FIGURE

FIG. 1 shows a cross-sectional view through a back seat arrangement according to the invention with a back seat bench and a backrest in the unfolded and folded-over positions.

DESCRIPTION OF THE PREFERRED EMBODIMENTS

A back seat arrangement 11 is arranged behind a front seat backrest 10 and has a back seat bench 12 and a backrest 13. The back seat bench 12 is shown in broken lines in the unfolded position and essentially rests by its front and its rear regions on a section of the bodywork 14 or a component fixedly connected to the bodywork. In its front region, a pivot hinge 15 is provided on the back seat bench 12, is fixedly connected to the bodywork 14 and has a pivot axis 16 extending transversely to the direction of travel and horizontally, about which the back seat bench 12 can be folded up from its flat position into an upright position and folded back again. To fold up the back seat bench 12, tabs, handles or the like (not shown) are fixed in its rear region and are easily accessible in the flat position of the back seat bench 12. In the folded-up upright position, the back seat bench 12 is preferably supported by a section of the seat surface 17 in its rear region against the rearward side 18 of the front seat backrest 10. However, the range of forward pivoting of the back seat bench 12 can also be limited by a stop on the pivot hinge 15, especially if the front seat is locked in a position offset further forwards. In its unfolded position, the back seat bench 12 can additionally be secured to the bodywork by a releasable retaining device (not shown) to prevent unwanted pivoting.

In its unfolded, upright position, the backrest 13 borders with one rear wall 19 against a luggage compartment 20 of the motor vehicle and has seatings 21 for head restraints 22 in its upper region. Integrated into the backrest 13 is an armrest 23 which—as shown here—forms part of the backrest surface 24 when folded up or provides additional travel comfort for a passenger when folded down. In addition, retaining devices, not shown, are provided on the backrest 13 which prevent unwanted pivoting of the backrest 13 and secure the latter in its upright position to the bodywork or a component connected thereto. After the back seat bench 12 has been folded up into its upright position, the backrest 13 can be tilted forwards into a flat position about a pivot axis 25 which extends transversely to the direction of travel and horizontally and is located in a lower region of the backrest 13.

In the region between the back seat bench 12 and the backrest 13, an intermediate padded part 26 is fixedly arranged on the bodywork 14 by screw connections 27, extends essentially transversely to the direction of travel and horizontally, and forms a section of the seat surface 17 and of the backrest surface 24. As an alternative to the screw connection 27, a plug-in or latching or similar connection may be used. The intermediate padded part 26 consists of a supporting part (not shown), which may be either back-foamed or conventionally padded. In the intermediate padded part 26, which can be of either one-piece or multi-piece design, an associated recess 29 in the form of a material pocket, a plastic mounting or the like is inserted for at least one rear belt buckle 28 and receives the rear belt buckle 28 with substantial play. In addition, the recess 29 creates a fixed connection between the rear belt buckle 28 and a rear belt buckle fixture 30 fixed on the bodywork section 14. The fixing of the rear belt buckle fixture 30 is provided via a screw connection (not shown).

When the back seat bench 12 and the backrest 13, including the head restraint 22, are pivoted, the intermediate padded part 26 together with the rear belt buckle 28 arranged in the recess 29 remains fixed on the bodywork section 14.

The distance in the region between the back seat bench 12, folded up into the upright position, and the pivot axis 25 of the backrest 13 is dimensioned so that the backrest 13, jointly with the head restraint 22 arranged on it, as indicated by the broken circular line 31, is accommodated behind the back seat bench 12 when folded over into the flat, approximately horizontal position. As a result, the rear wall 19 of the folded-over backrest 13 forms an approximately level and horizontal loading surface together with a luggage compartment loading surface 32. The intermediate padded part 26 is so designed that it is accommodated below the backrest 13, situated in the folded-over flat position, and does not interfere with the seating of the backrest 13 on the bodywork 14.

The width of the back seat bench 12 between its pivot hinge 15 and its rear region is so dimensioned that the back seat bench in the folded-back, flat position—as indicated by the broken circular line 33—ends flush with the intermediate part 26. This does not result in any penetration 34, shown hatched, of the backrest 13 by the back seat bench 12, which is usual in previously customary back seat arrangements 11. Similarly, the backrest 13 folded back into the upright position forms a flush joint with the intermediate part 26.

As shown in FIG. 1, further recesses 35 to receive one fixing section 36 each may be provided in the intermediate padded part 26. The fixing sections 36 are arranged fixedly on the bodywork 14, for example by means of screw connections or welded connections, and serve to secure a child seat (not shown) which can be secured on two fixing sections 36, for example, by latching, suspension or the like. For this purpose, the intermediate padded part 26, which in its installed position masks the fixing sections 36, can be removed, either completely or to the extent of one section thereof, so that the fixing sections 36 become freely accessible. Alternatively, an intermediate padded part 26 may also be used whose recesses 35 pass completely through the intermediate padded part 26 and thus create free access to the fixing sections 36. In order for the seating comfort of the rear seat passengers not to be impaired by the recesses 35 passing through, the intermediate padded part 26 is offset slightly downwards or rearwards compared to the seat and/or backrest surface 17, 24. It is conceivable here for the intermediate padded part 26 to be designed either fixed or removable and replaceable, in which case, when necessary, an intermediate padded part 26 masking the fixing sections 36 can be replaced by one which permits free access to the fixing sections 36.

It is also to be considered as included within the scope of the invention for the intermediate padded part 26 fixed on the bodywork section, instead of forming—as shown in FIG. 1—a structure with an approximately semicircular cross section, also to form a relatively large partial region of the seat surface 17 and/or backrest surface 24. Accordingly, the intermediate padded part 26 would be widened to include a seat and/or backrest part.

It is also to be regarded as included within the scope of the invention for the intermediate padded part 26 not necessarily to be arranged in the region of the angle between seat surface and backrest surface 17, 24 but also to be displaced into the seat surface or backrest surface 17, 24.

In addition, a further embodiment of the invention encompasses the possibility of the rear belt buckle 28 and the rear belt buckle fixture 30 being fixed directly to the intermediate padded part 26 and, via the latter, to the bodywork 14 and secured thereon, in which case the intermediate padded part 26 is anchored correspondingly securely to the bodywork 14.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Arrangement for a passenger compartment, especially of a motor vehicle, comprising:
   a back seat bench which can be folded up into an upright position about a pivot axis arranged in its front region,
   a backrest, which can be tilted forwards into a flat position about a pivot axis arranged in its lower region,
   at least one rear belt buckle, which is fixedly connected to bodywork of the motor vehicle, and
   an intermediate padded part arranged between the back seat bench and the backrest, which extends in the transverse direction of the vehicle and which receives at least one rear belt buckle in an operating position,
   wherein the intermediate padded part remains stationary on the bodywork irrespective of a pivoted position of the back seat bench and/or backrest.

2. Arrangement according to claim 1, wherein the intermediate padded part extends over the entire width of the arrangement.

3. Arrangement according to claim 1, wherein the intermediate padded part is of one-piece or multi-piece design.

4. Arrangement according to claim 1, wherein at least a section of the intermediate padded part is removable.

5. Arrangement according to claim 4, wherein the intermediate padded part masks fixing sections fixed to the bodywork.

6. Arrangement according to claim 5, wherein the fixing sections fixed to the bodywork serve to secure a child seat to the bodywork.

7. Arrangement according to claim 5, wherein the intermediate padded part can be replaced by a padded part making the fixing sections fixed to the bodywork accessible.

8. Arrangement according to claim 1, wherein the intermediate padded part forms part of at least one surface of the back seat bench and the backrest.

9. Arrangement according to claim 1, wherein the intermediate padded part possesses at least one recess which receives the rear belt buckle and by which the rear belt buckle is connected via a rear belt buckle fixture to the bodywork.

10. Arrangement according to claim 1, wherein the intermediate padded part forms a rear belt buckle fixture which receives the rear belt buckle and connects it to the bodywork of the motor vehicle.

11. Arrangement according to claim 1, wherein the intermediate padded part is so arranged on the bodywork, and contoured in such a way, that in the flat position, the backrest sits unimpaired on a section of the bodywork and the intermediate padded part is completely masked by the backrest.

12. Arrangement according to claim 1, wherein the backrest, in its flat position, is supported on a bodywork side by the backrest surface and/or at least one head restraint arranged on the top of the backrest.

13. Arrangement according to claim 1, wherein a distance between the back seat bench, folded up into the upright position, and the pivot axis of the backrest is dimensioned so that the backrest can be tilted forwards into a virtually horizontal position with or without a head restraint arranged on its top.

14. Arrangement according to claim 1, wherein a rear wall of the backrest in the flat position is adapted to form a virtually even loading surface with a luggage compartment loading surface.

15. Arrangement for a passenger compartment, especially of a motor vehicle, having:

a back seat bench which is pivotal about a pivot axis arranged in its front region, a backrest which is pivotal about a pivot axis arranged in its lower region, at least one rear belt buckle which is fixedly connected to bodywork of the motor vehicle, and an intermediate padded part which is arranged between the back seat bench and the backrest, which extends in the transverse direction of the vehicle, and which can receive at least one rear belt buckle, the intermediate padded part remaining stationary on the bodywork independently of pivotal movement of the back seat bench and/or backrest.

16. Arrangement according to claim 15, wherein the intermediate padded part extends over the entire width of the arrangement.

17. Arrangement according to claim 15, wherein the intermediate padded part is of one-piece or multi-piece design.

18. Arrangement according to claim 15, wherein at least a section of the intermediate padded part is removable.

19. Arrangement according to claim 18, wherein the intermediate padded part masks fixing sections fixed to the bodywork.

20. Arrangement according to claim 19, wherein the fixing sections fixed to the bodywork serve to secure a child seat to the bodywork.

\* \* \* \* \*